Nov. 9, 1943.    J. C. WILLIAMS    2,333,909
PIPE JOINT AND LIKE COUPLING
Filed Jan. 14, 1942
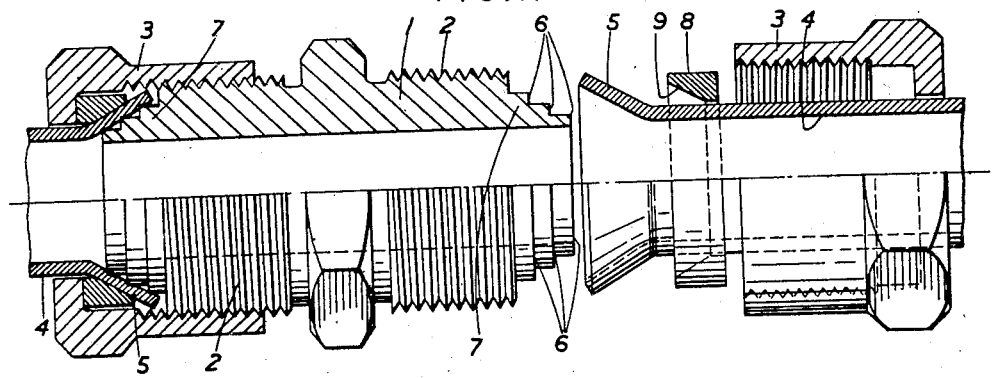
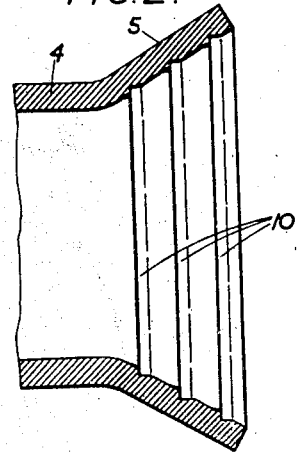
JOHN CHARLES WILLIAMS INVENTOR
BY Haseltine, Lake & Co
ATTORNEYS Patented Nov. 9, 1943

2,333,909

UNITED STATES PATENT OFFICE 2,333,909

PIPE JOINT AND LIKE COUPLING

John Charles Williams, near Slough, England

Application January 14, 1942, Serial No. 426,731
In Great Britain February 10, 1941

1 Claim. (Cl. 285—86)

This invention relates to pipe joints and like couplings wherein the coupling member or other fitting is formed with a partly conical protuberance which enters the extremity of the pipe or tube, the latter having been previously flared or belled at its extremity, the part conical part of the coupling member and inner surface of the flared part of the pipe or tube being drawn together by a nut in threaded engagement with the coupling member. In certain cases the member which actually entered the flared extremity of the pipe or tube consisted of a separate part known as an olive. The present invention is applicable to either of the above types of joints or couplings, the chief object being to effect certain improvements in such joints or couplings which will give them improved self-sealing properties and which, whilst providing a more or less perfect joint, will nevertheless permit of the parts being separated for inspection.

The present invention can be used with advantage with pipe joints and like couplings for use in hydraulic systems, for use on aircraft or on board ship, but can be used in any hydraulic, steam, or other system of piping.

A pipe joint or like coupling of the kind to which the invention relates is characterised according to the invention by the provision of one or more annular cutting edges on the partly conical part of the member which enters the flared extremity of the pipe or tube for the purpose of cutting into the inner surface of the pipe and forming one or more annular ridges thereon as a result of tightening up the nut, the ridge or ridges forming a seating or seatings for the annular cutting edge or edges and thus providing a self-sealing joint between the pipe and coupling member or fitting.

It is preferred that the coupling member shall be formed with at least two such annular cutting edges, the edges being so shaped that the action of tightening up the nut causes the metal or other material of the inner surface of the pipe to be forced inwardly into abutting relationship with the coupling member adjacent the cutting edges.

In this way each cutting edge co-operates with a correspondingly shaped seating, the accurate interengagement of the parts providing a perfect sealed joint whilst at the same time permitting of the pipe being separated from the coupling member for inspection either during the process of initially cutting the annular ridges to ensure that they are of the desired depth or at any subsequent time.

In order that the said invention may be clearly understood and readily carried into effect, the same will now be described more fully with reference to the accompanying drawing, in which:

Figure 1 is a part sectional side elevation of a pipe joint or coupling constructed in accordance with the invention; and Figure 2 is a fragmentary sectional view drawn to an enlarged scale and illustrating the belled or flared extremity of one of the pipes and the annular grooves formed therein.

In the construction illustrated by the accompanying drawing, the coupling member 1 is externally screw threaded at 2 to receive internally threaded sleeve nuts 3 which are provided with flats to receive a suitable spanner.

The copper, steel, or other metal tubes 4 shown in said figures are flared or belled as at 5 at their extremities, the angle of flare being such that the inner flared surfaces will engage annular cutting edges 6 formed on each part conical end 7 of the centrally arranged coupling member. It will readily be seen from Figure 1 that these cutting edges 6 are each formed between two annular surfaces of different diameter, the annular surfaces lying parallel and also parallel to the axis of the coupling member.

A metal pipe collar 8 is placed on each of the pipes, the pipe collars being tapered internally as at 9, the angle of taper corresponding to the angle of flare on their associated pipes. An angle of 32° to the horizontal is suggested by way of example as a convenient angle to employ as the angle of flare, cone angle, and angle of taper of the pipe collars, although it must be understood that any other suitable angle may be employed if desired.

By engaging the sleeve nuts 3 with the externally threaded parts of the coupling member, and rotating the nuts in the required direction, the pipe collars 8 will be moved inwardly into contact with the belled ends of the pipes, thereby forcing the internal belled surfaces of the pipes into intimate contact with the cutting edges formed on the conical ends of the coupling member. Further rotational movement of the sleeve nuts with the assistance of a spanner will cause the cutting edges to cut into the internal belled surfaces of the pipes in a direction parallel with the axis of the pipes and to a depth approximating two to four thousandths of an inch, thereby forming annular grooves 10 such as are shown in Figure 2, and annular ridges which constitute seatings for the correspondingly positioned annular surfaces on the conical ends of the coupling member, thus providing a joint which will effectively prevent any leakage of oil or other fluid when used in hydraulic, steam, or other pipe systems. Furthermore, the joint can at any time be dismantled for inspection and reassembled without in any way impairing its efficiency, the annular ridges formed within the flared end of the pipe and corresponding parts on the coupling member resuming their former intimate engagement upon the sleeve nuts being again tightened.

The joint is suitable for connecting together tubes or pipes composed of copper, brass, Duralumin, steel, or other metals, and in the case of a joint intended for use in connection with steel tubes, it is found to be of advantage to harden the cutting edges slightly so that they will readily bite into the belled surfaces of the steel tubes.

To enable the seatings in both pipes to be formed in one operation, the externally screw threaded parts of the coupling member may be of opposite lead, the nuts in this case being held stationary while the coupling member is rotated, the nuts being thus drawn inwardly at the same time, the final tightening up of the nuts being performed by turning the nuts individually.

The coupling member is bored internally and this boring may correspond in diameter to the internal bore of the pipes or tubes which are to be joined together, thereby in no way interfering with the free flow of fluid past the joint.

Although the invention has been shown applied to a pipe joint or coupling for connecting two pipes or tubes in end to end relationship, it may nevertheless be employed for the attachment of a tube to a suitable fitting, in which case the fitting itself may be formed with an externally threaded protuberance terminating in a part conical or stepped portion having cutting edges and for the reception of a sleeve nut. For example, in the case of Figure 3, the invention may be incorporated in a nozzle or other fitting which it may be desired to connect to a rubber or other flexible tube.

Instead of the annular cutting edges being formed on the coupling member itself they may be formed on a separately formed olive which enters the belled or flared end of the pipe or tube, the cutting edges cutting into the inner surface of the pipe or tube during the usual operation of tightening up the nut on the threaded part of the fitting with which the olive is associated. When applied to olives the interengagement of the cutting edges with the annular ridges formed therewith prevents twisting of the olive on assembly.

It will readily be apparent from the foregoing description that such a joint as is hereinbefore described can be made by unskilled labour in situ and as previously mentioned has the advantage of not only providing a perfect seal against leakage of oil or other fluid but can be quickly dismantled and reassembled without impairing its efficiency.

What I claim and desire to secure by Letters Patent of the United States is:

In a pipe joint or coupling including an externally threaded screw coupling member having a reduced projection consisting of a plurality of spaced annular shoulders forming cutting edges adapted to enter the extremity of an outwardly flared pipe, a sleeve nut in screw-threaded connection with the coupling member and the flared surface of the pipe for forcing said pipe against said shoulders, the contact between the externally-threaded coupling member and the pipe being confined to the spaced cutting edges and forming therewith a series of substantially continuous line contacts.

JOHN CHARLES WILLIAMS.